United States Patent [19]

Rutledge

[11] 4,053,964
[45] Oct. 18, 1977

[54] HARD-SHELLED CRUSTACEAN MEAT RECOVERY PROCESS

[76] Inventor: James E. Rutledge, 13543 Honey Drive, Baton Rouge, La. 70808

[21] Appl. No.: 690,287

[22] Filed: May 26, 1976

[51] Int. Cl.² ............................................. A22C 29/00
[52] U.S. Cl. ......................................... 17/48; 17/71; 426/479
[58] Field of Search .................. 17/48, 45, 46, 71, 56; 99/568; 426/524, 479, 480

[56] References Cited

U.S. PATENT DOCUMENTS

| | | | |
|---|---|---|---|
| 2,501,655 | 3/1950 | Altenburg | 426/524 X |
| 2,600,867 | 6/1952 | Gerritsen | 426/479 X |
| 2,978,334 | 4/1961 | Lapeyre | 17/48 X |
| 3,471,894 | 10/1969 | Tasker | 17/48 |

*Primary Examiner*—David H. Brown
*Attorney, Agent, or Firm*—Roy, Kiesel, Patterson, Hudson & Abadie

[57] ABSTRACT

Disclosed are processes for preparing hard shelled crustaceans for extraction of their body meat from their shells, as well as, processes for extraction of the body meat from hard shelled crustaceans.

3 Claims, No Drawings

HARD-SHELLED CRUSTACEAN MEAT RECOVERY PROCESS

BACKGROUND OF THE INVENTION

1. Field of the Invention

This invention relates generally to butchering, and more particularly, to processes for preparation and removal of body meat from hard shelled crustaceans such as crab, crayfish, lobster and rock shrimp.

2. Prior Art

The extraction of meat from the body of hard shelled crustaceans such as crab, crayfish, lobster, and rock shrimp, as opposed to soft shelled crustaceans such as all shrimp species, other than rock shrimp, has proved to be very difficult, time consuming and expensive.

Many of the difficulties stem from the physical structure of the hard shelled crustaceans' shell (this is particularly true for the crab), the manner in which the meat is stuck to the shell, the need to extract and maintain the meat in a minimum bacteriological manner, as well as, the commercial desire to extract the meat in lump form rather than many small pieces. The research, both by industry and universities, has been extensive and has resulted in various improvements in the meat extraction processes.

Pre-treatment of the crustaceans by chemicals, the use of certain cooking conditions, the use of machines which squeeze the meat out, or which core and centrifuge the meat out, or which air or water blast the meat out, or which freeze and explode the meat out have been proposed and advanced with varying degrees of success. A good summary of the recent patent art in this area may be found in a book entitled "Fish and Shellfish Processing" by M. T. Gillies and published by Noyes Data Corporation, Noyes Building, Park Ridge, New Jersey. There is, however, still a need in the seafood industry for processes for facilitating the removal of meat from hard shelled crustaceans.

SUMMARY OF THE INVENTION

Therefore, one object of this invention is to provide a process for treating uncooked meat in a hard shelled crustacean to facilitate the removal of the meat from the shell in uncooked form.

Another object of this invention is to provide a process for removal of uncooked meat from hard shelled crustaceans.

Other objects and advantages of this invention will become apparent from the ensuing descriptions of the invention.

Accordingly, a process for pretreating hard shelled crustaceans to facilitate the removal of uncooked meat from the hard shelled crustaceans is provided comprising the steps freezing and then thawing the uncooked meat in the shell before the extraction of the uncooked meat from the shell.

In another embodiment of this invention a process for the extraction of meat from hard shelled crustaceans is provided comprising the freezing of the meat in the shell, then thawing the meat while still in the shell and finally extracting the uncooked meat from the shell by conventional processes.

PREFERRED EMBODIMENTS OF THE INVENTION

Without any intent to limit this invention, the preferred embodiments will be described and explained with specific reference to the extraction of meat from crabs.

The live crabs are first frozen. The freezing step may be either by conventional "quick freezing" techniques or by merely placing the crabs in a standard freezer compartment. One of the benefits of this invention is that the crabs can be stored frozen for long periods of time without detriment to the quality of meat produced. This allows the crab processing plant to control its production schedule by purchasing more crabs than it can process during the season (June - November) and store them for processing until the off-season (December - May).

After the crabs have been frozen and are ready for further processing they are thawed. This thawing can be accomplished by simply leaving the crabs out at room temperature. If this is done, care must be taken not to let the meat remain in unthawed condition too long in order to avoid any spoilage of the meat. It is important that the meat not be either partially cooked or cooked during the thawing step. Therefore, the meat should not be thawed by exposing it to hot water or steam for any period of time which would even partially cook the meat. After thawing the uncooked meat in the shell it is ready to be treated by any of the conventional meat extraction processes, except that no cooking of the meat is allowed until after the meat has been removed from the shell.

In one extraction step the crab has its back shell and leg appendages removed, the remaining shell split into two halves, the internals and fat removed by brushing and washing and finally the cleaned halves passed between two rollers which squeeze the meat out from the shell. Since the pretreating steps have effectively separated the bond between the meat the shell's interior surface and since the met is in a flexible "jelly-like" condition, it is forced out of the shell by the rollers in lump form.

In another extraction step, the crab body is cored and the core placed on conventional centrifuge device to spin the meat out of the core. Another method to extract the meat would be to use air or water to blow the meat from the crab shell after the back and leg appendages have been removed. Of course, the crab meat could be extracted by hand. Regardless of which extraction step is utilized the pretreatment by freezing and thawing facilitate the removal of the uncooked meat.

After the meat has been removed, it may be cooked before packaging.

There are, of course, many alternative steps that could be made in this invention and their omission is not meant to limit the scope of this invention as set forth in the claims below.

What I claim is:

1. A process for pretreating hard shelled crustaceans to facilitate removal of uncooked meat from the hard shelled crustaceans' shells which comprises first freezing the uncooked hard shelled crustacean and then thawing, without cooking, the frozen hard shelled crustacean.

2. A process for extraction of uncooked meat from hard shelled crustaceans which comprises freezing the uncooked hard shelled crustacean, then thawing, without cooking, the frozen hard shelled crustaceans, and finally extracting the uncooked meat from the shell.

3. A process according to claim 2 wherein the extracted uncooked meat is cooked.

* * * * *